US010360195B1

(12) United States Patent
McKelvie et al.

(10) Patent No.: US 10,360,195 B1
(45) Date of Patent: Jul. 23, 2019

(54) ABSOLUTE AND RELATIVE LOG-STRUCTURED STORAGE

(71) Applicant: Amazon Technologies, Inc., Reno, NV (US)

(72) Inventors: Samuel James McKelvie, Seattle, WA (US); James McClellan Corey, Bothell, WA (US); Yan Valerie Leshinsky, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 13/928,242

(22) Filed: Jun. 26, 2013

(51) Int. Cl.
*G06F 16/00* (2019.01)
*G06F 7/00* (2006.01)
*G06F 16/22* (2019.01)

(52) U.S. Cl.
CPC .................................. *G06F 16/22* (2019.01)

(58) Field of Classification Search
CPC ......... G06F 17/30011; G06F 17/30286; G06F 17/30067; G06F 17/30575; G06F 17/2288
USPC ........................................................ 707/638
See application file for complete search history.

(56) References Cited

U.S. PATENT DOCUMENTS

| | | | | |
|---|---|---|---|---|
| 5,634,052 A * | 5/1997 | Morris | ................. | G06F 11/1448 707/640 |
| 7,257,690 B1 * | 8/2007 | Baird | .................. | G06F 11/1471 707/999.202 |
| 2007/0226214 A1 * | 9/2007 | Smits | ................... | H04L 67/1008 |
| 2010/0185847 A1 * | 7/2010 | Shasha | ................ | G06F 11/1004 713/150 |
| 2010/0211554 A1 * | 8/2010 | Reid | .................... | G06F 16/2315 707/703 |
| 2012/0278429 A1 * | 11/2012 | Miura | ................. | G06F 11/2041 709/217 |
| 2012/0303581 A1 * | 11/2012 | Calder | .................... | G06F 16/27 707/626 |
| 2013/0117307 A1 * | 5/2013 | Vishnoi | ............. | G06F 17/30362 707/770 |
| 2013/0290253 A1 * | 10/2013 | Budinsky | ............ | G06F 16/2228 707/624 |
| 2013/0346725 A1 * | 12/2013 | Lomet | ..................... | G06F 12/10 711/206 |

* cited by examiner

*Primary Examiner* — Usmaan Saeed
*Assistant Examiner* — Raquel Perez-Arroyo
(74) *Attorney, Agent, or Firm* — Davis Wright Tremaine LLP

(57) ABSTRACT

A database management system may utilize a log-structured storage system instead of a conventional storage system. The log-structured storage system may store a baseline of an object and a series of log entries describing changes to the object. At various positions in the log, a combined record may be written to contain a description of a change to the object and a copy of the corresponding version of the object. Combined records may be used to employ alternative strategies for constructing or transmitting a version of an object. Embodiments may employ these alternative strategies for replication and data caches.

22 Claims, 12 Drawing Sheets

ABSOLUTE AND RELATIVE LOG-STRUCTURED STORAGE

BACKGROUND

Log-structured storage systems may be used as a storage component in a distributed database management system. On a conventional storage system, data is changed by locating the existing data on a storage device and overwriting it. A log-structured storage system, on the other hand, may operate by appending a description of the changes to the end of a log file that describes a series of changes to the data. Log-structured storage systems may be efficient for scenarios that involve numerous updates, at least in part because existing data does not need to be located or overwritten.

One characteristic of log-structured storage systems is that they are not necessarily space efficient. Because data is not overwritten when it is changed, previous versions of data may consume a significant amount of storage space. Log-structured storage systems may perform coalescing and truncation operations as a technique for improving space utilization. Coalescing involves applying a sequence of changes to an object to a baseline version of the object, producing a subsequent version of the object that can be used as a new baseline. Truncation involves deleting or otherwise removing descriptions of changes that occurred prior to the new baseline. To realize the latest version of an object, a series of log entries may be traversed, starting with the most recent baseline. However, due to truncation, versions of the object prior to the new baseline are no longer realizable in this manner.

BRIEF DESCRIPTION OF DRAWINGS

The drawings provided herein are designed to illustrate example embodiments and are not intended to limit the scope of the disclosure.

DETAILED DESCRIPTION

Figure 1A:
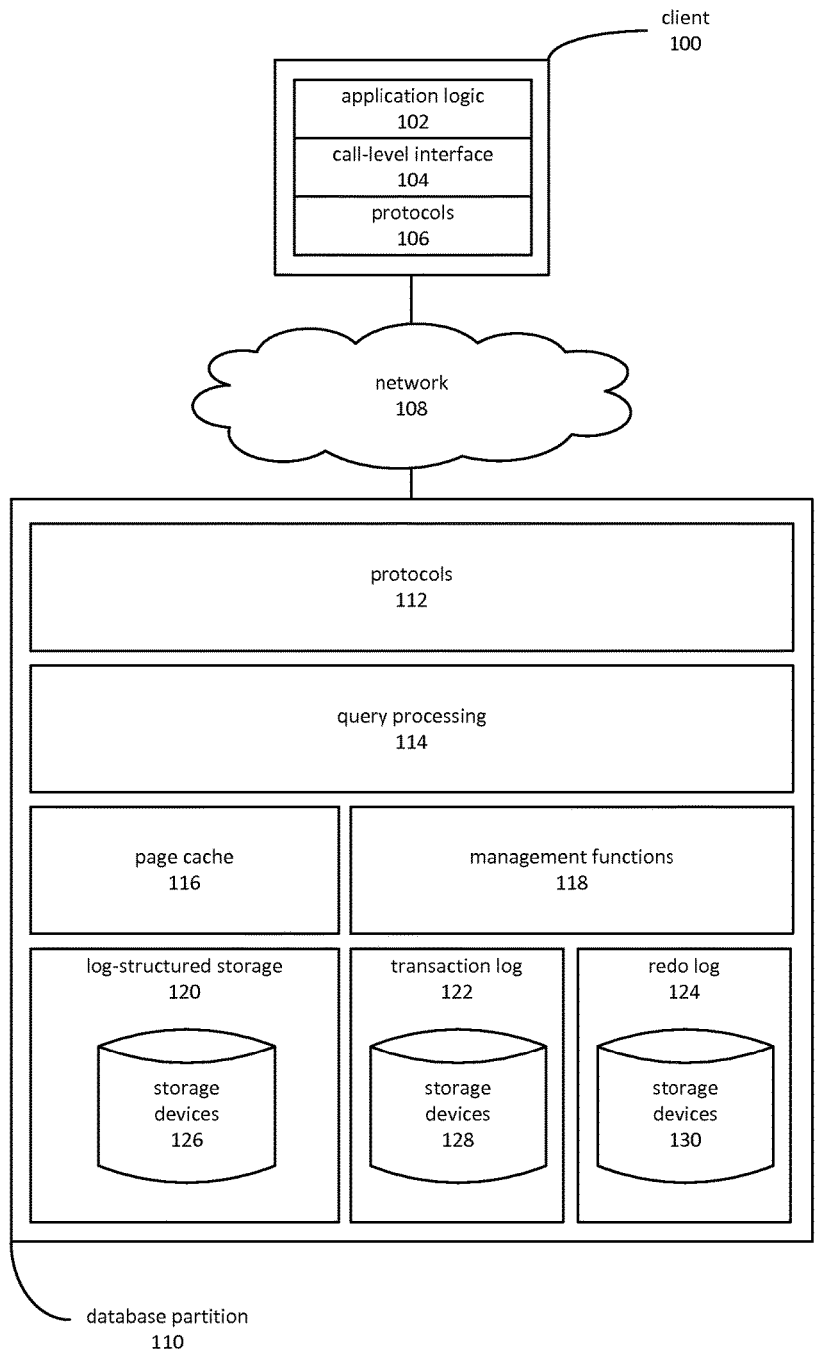
FIG. 1A is a block diagram depicting a database management system that employs a log structured storage system.

Database management systems may be composed of various subsystems, including various subsystems managing the storage and retrieval of data from various storage devices such as magnetic disk drives, solid-state storage devices, storage-area networks and so forth. A storage subsystem typically interfaces with other database subsystems and responds to requests to read or write data stored within files maintained on a storage device. Upon receiving a request to change data stored in one of the files, the storage subsystem typically causes the relevant portion of the file to be overwritten with the changed data.

Database management system may also employ another type of storage subsystem sometimes referred to as log-structured storage or journaling storage. As the name implies, log-structured storage involves maintaining a sequence of log entries that describe changes to a file, database page or other object relative to a baseline. The log-structured storage system can reconstruct the current state of an object by starting with a baseline of the object and applying the sequence of changes described by the log entries. The reconstructed object state may be considered to be a copy of the object. The log entries and the changes they describe may be referred to as deltas because they describe the difference between two versions of an object. Unlike more conventional approaches, a log-structured storage system may also be able to provide previous versions of the object, up to and including the baseline version.

Log-structured storage systems may also be employed in distributed systems, including distributed database management systems. Distributed systems may store copies of data on multiple computing nodes and employ various methods such as quorum-based commit and replication. Log-structured storage systems may be employed to propagate copies of data between the storage subsystems of computing nodes in a distributed system. This approach may allow for efficient data propagation because sequences of changes, rather than complete copies, can be shipped between computing nodes when the computing nodes share a common baseline. A complete copy of the data may, however, be needed when computing nodes do not share a common baseline. This situation may occur in a distributed computing system because each computing node may act independently to take actions that can result in a loss of baseline or change history information, such as truncating a log. One possible approach to this problem involves synchronizing activities that may result in the loss of baseline or change history information.

Embodiments of a log-structured system, as described herein, may be employed to improve distribution of data in a distributed system by allowing for greater flexibility in data retrieval and transmission. Using log records that include both baseline data and change descriptions, embodiments may retrieve, transmit or replicate data using various combinations of change descriptions and/or baseline information, based on an approach determined to be preferable based on various factors such as data size or processing requirements. Embodiments may use techniques described herein to avoid synchronizing computing node activities that may result in loss of baseline or change history information.

Embodiments may also be employed to improve data retrieval and transmission between a log-structured storage system and various clients. A client may request some version of an object, including in the request data indicative of baseline and change history information already in the client's possession. Embodiments may use this data to retrieve and transmit some combination of baseline and/or change history information to a client, allowing the client to construct the requested version of the object using the transmitted information and the information already in its possession.

The term "object" may be used to describe any of a variety of entities, such as database pages, database rows, binary strings, memory regions, files on a storage device and so forth. A database object may include any representation of database data such as a database page, extent, row, column, binary value and so forth. Examples of non-database objects include files, documents, data structures and so forth. For convenience in representation, many of the illustrative embodiments described herein use nomenclature corresponding to a row-type object composed of columns or fields. For example, a figure might indicate that the value of "C1" is equal to "AAA." The use of this nomenclature is for convenience only and should not be viewed as limiting the scope of the disclosure. A delta log record might, for example, described changes to fields or regions within a binary object instead of changes to the columns of a row-type object. Embodiments may represent changes as substitutions of a region of memory, as an operation on memory, as a function on memory provided with various inputs and so forth.

FIG. 1A depicts an embodiment of a database management system employing a log-structured storage subsystem. Various clients, such as client 100 may be communicatively coupled to database partition 110 via one or more networks such as network 108. As used herein, the term "database partition" may refer to a standalone database management system or to a component of a distributed database management system. In some embodiments, database tables may be horizontally partitioned, so that database partition 110 might contain one segment of a horizontally partitioned table. Each database partition may operate on a separate computing node. Embodiments may also operate multiple partitions on a computing node. Network 108 may comprise various network types such as the Internet, intranets, virtual private networks and so forth.

Client 100 may be implemented using a wide variety of components and architectures. For illustrative purposes, client 100 is depicted in FIG. 1A as comprising application logic 102, call-level interface 104 and protocol layer 106. Call-level interface 104 represents any of a variety of software components providing functionality related to storing and retrieving data on a database, such as open database connectivity ("ODBC") interfaces. Protocols 106 represents various software components and methods of transmitting and receiving data over the network in a manner compatible with protocols 112 element of database partition 110.

Query processing 114 may perform functions such as query parsing, query optimization, plan generation, plan execution and so forth. Requests related to the storage and retrieval of data, originating from client 100, may be received by query processing 114 and handled through interaction with log-structured storage 120 and page cache 116.

Management functions 118 may perform various functions involving the storage and retrieval of data, such as those related to transaction management, data consistency, failure recovery and so forth. A transaction log 122 may write to one or more storage devices 128, and may contain records of uncommitted changes to data maintained by the system. In the event of failure, uncommitted changes in transaction log 122 may be rolled back to place the system in a consistent state. Redo log 124 may write to one or more storage devices 130, and may contain records of committed changes. Redo log 124 may be consulted in the event that a system failure requires previously committed changes to be reapplied.

Page cache 116 may operate in conjunction with log-structured storage 120 to retrieve data stored on one or more storage devices 126. A database storage management subsystem may read and write data to storage devices using a page structure as a quantum unit of input and output. A page may for example comprise a collection of row data along with various header information and metadata. Embodiments may use other entities as the basis of input and output, such as rows or items. Page cache 116 can hold copies of page data in memory. Embodiments may hold page data in memory using a log-like structure similar to that employed by log-structured storage 120.

The database storage subsystem may also comprise log-structured storage 120. In general terms, log-structured storage 120 may comprise a method for storing data using baseline and delta information. A linked sequence of baseline and delta information for an object may be referred to as a log. Each database page may be represented by a separate log. Some embodiments may use logs to represent other structures, such as database files.

Figure 1B:
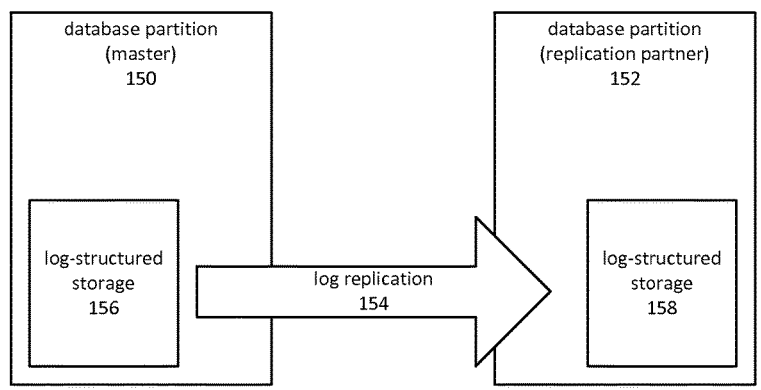
FIG. 1B is a block diagram depicting replicating log-structured storage systems between database partitions.

Data maintained on a database partition may be replicated to other database partitions. FIG. 1B depicts an example of replication in a database management system that employs log structured storage. Database partition 150 may serve as a master with one or more replication partners, such as database partition 152. Database partition 150 may comprise log-structured storage 156. Logs from log-structured storage 156 may be replicated, as depicted by arrow 154, to log-structured storage 158 on database partition 152. In contrast to database management systems that employ conventional storage, this replication may occur between the storage subsystems themselves, rather than through non-storage related database subsystems.

Figure 2A:
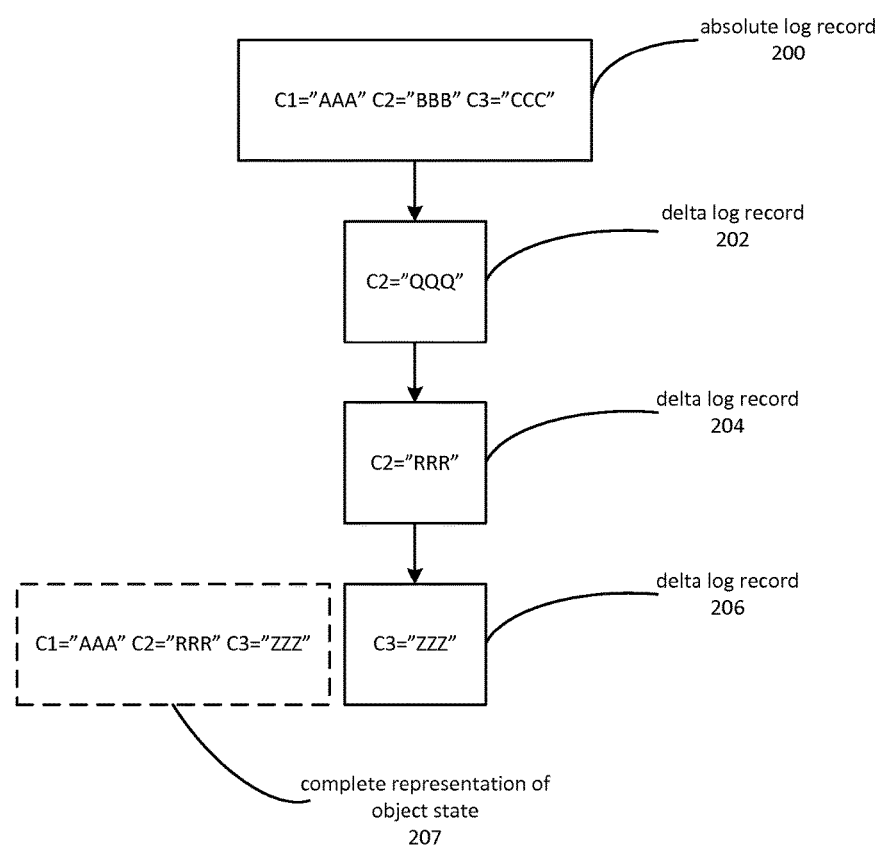
FIG. 2A is a block diagram depicting an embodiment of log-structured storage that comprises an absolute log record and a sequence of delta log records.

FIG. 2A shows an example of a log-structured storage system employing a sequential log. An absolute log record 200 may contain a complete representation of an initial state for an object, which for this example is assumed to be three columns "C1," "C2" and "C3."

A sequence of updates to the object may then be received. Rather than updating the memory in place, a log entry describing the changes is appended to the end of the log file. The first delta log record 202 represents the value of column "C2" changing to the value "QQQ." The same column is changed again to "RRR," as reflected by the second delta log record 204. The third change involves column "C3" changing to the value "ZZZ," as indicated by the last delta log record 206. In various embodiments, changes to the object may be described as operations on regions of memory, including application of functions on regions of memory. For example, a delta log entry might comprise an indication that values contained in a region of memory should be multiplied by two. Another example, among many possibilities, involves inserting values into a region of memory.

A complete representation of the object may be formed by traversing the structure beginning at absolute log record 200 and applying any changes. A complete representation of the object's state is depicted by element 207. Forming a representation of the object's complete state may also be described as reconstructing the object or materializing the object. Any representation of the object's complete state may be considered to be a copy of the object. The copy may be a binary representation of the complete object state, or a compressed representation of the complete object state. A delta log record, in contrast, would be an incomplete representation of the object's state. In the depicted example, the resulting state would correspond to an object {"C1"="AAA," "C2"="RRR," "C3"="ZZZ"}. An object other than a row-type object could be handled similarly. For example, log entries could describe changes to regions of a binary object, e.g. by specifying an offset within the binary object and a sequence of new replacement values. The binary object could be materialized by traversing the list beginning from a first absolute log record to a last delta log record and applying each described change in turn.

Log-structured storage systems may be space inefficient, which among other issues may cause the log to consume an inordinate amount of space on a storage medium. This may be the case even for objects whose actual size is relatively small. For example, an object representing a four-byte value might be associated with a high number of changes to the value. In the system depicted by FIG. 2A, each modification might result in a separate log entry and the representation of the object in the log-structured storage system might take up many times the original object's size.

Figure 2B:
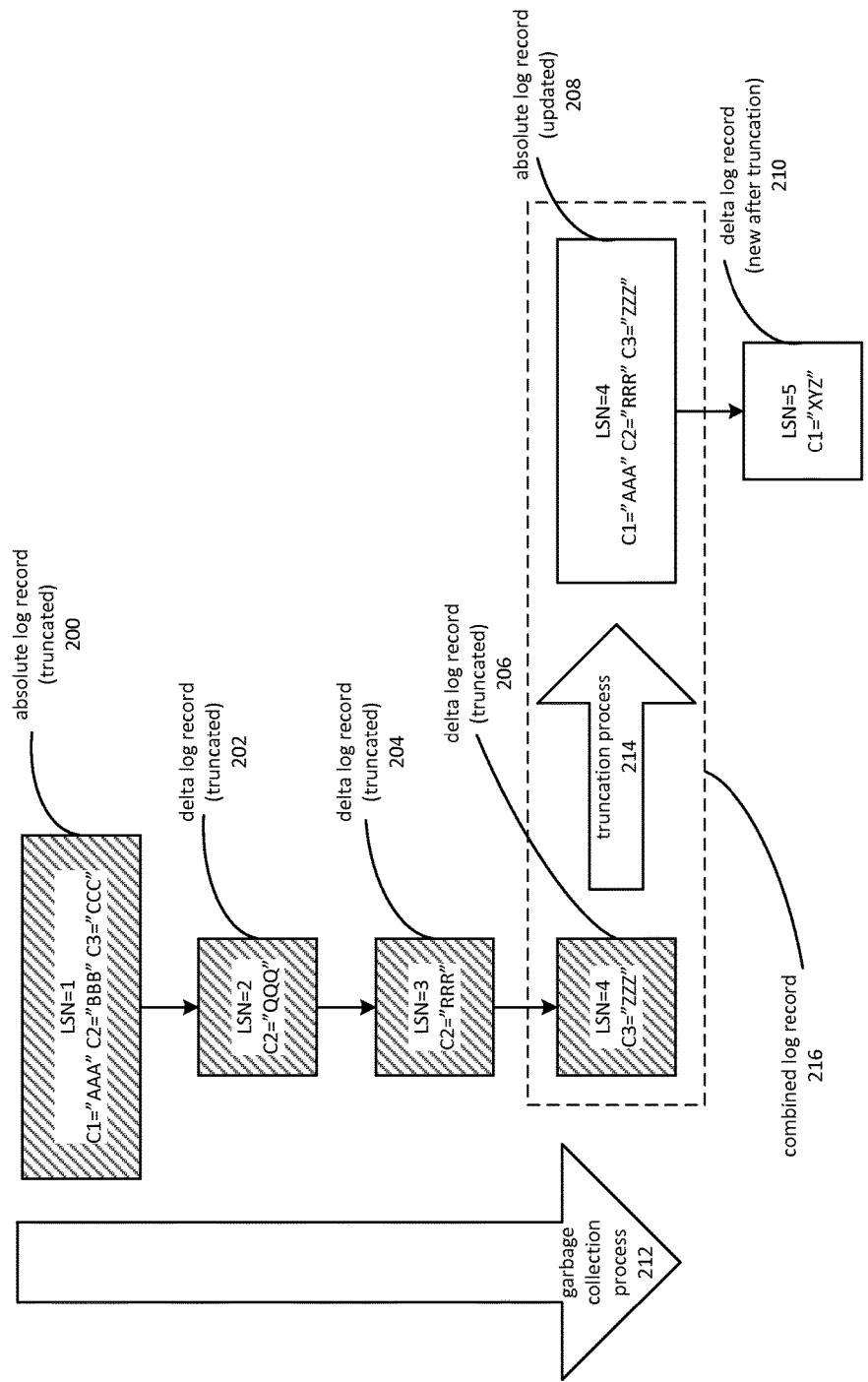
FIG. 2B is a block diagram depicting an embodiment of log truncation.

One approach to space efficiency involves truncating the log, a technique depicted in FIG. 2B. Prior to truncation, absolute log record 200 and delta log records 202, 204 and 206 represent the current state of an object which may be obtained by a sequential scan of the absolute and delta log records, beginning with absolute log record 200.

Various factors may trigger a truncation event, such as running low on storage space, exceeding a threshold number of delta log records and so forth. In FIG. 2B, the truncation event is depicted as truncation process 214. As noted, space efficiency is one reason to perform a truncation. Another is computational efficiency. Because a shortened log file will take less time to scan, the state of the object may be computed more quickly. In the depicted example, log entries prior to the object version corresponding to delta log record 206 will be truncated. A record corresponding to LSN=4 may be stored as combined log record 216, containing information corresponding to both delta log record 206 and absolute log record 208.

In order to remove log entries corresponding to versions of the object prior to the truncation point, the current state of the object may be recorded in an updated absolute log record 208. Obtaining the current state involves traversing the log chain to obtain the most recent values for any field contained by the object, and storing those values in absolute log record 208. The previous portion of the log, from absolute log record 200 to delta log record 206, may be truncated. Use of the log file may then proceed by appending new delta records to present further changes to the object, such as delta log record 210. After truncation, obtaining the full state of the object is more efficient because there are fewer nodes to traverse.

Truncated log entries, such as absolute log record 200 and delta log records 202, 204 and 206, may be reclaimed through a process known as garbage collection. Various approaches may be utilized. The space used to store the log entries may be freed for use by the underlying storage device. The space might also be reclaimed for use by subsequent log entries. For example, the storage space used for delta log record 202 might later be used by a new delta log record based in part on the actions of garbage collection process 212. Log-based storage systems may employ background processes to perform garbage collection, so that performance of the write path is not blocked while truncated entries are reclaimed.

Another approach to space efficiency involves using a circular log. In a circular log, the entries are limited to a finite set wherein new entries are written to the log in sequential order until the end of the log is reached, after which the log wraps around and new entries are written to the beginning of the log. Circular logs thus incorporate garbage collection into their course of operation. Baseline data that has not been overwritten may be appended as a new log entry, so that the complete set of data may be constructed by traversing the log.

Figure 2C:
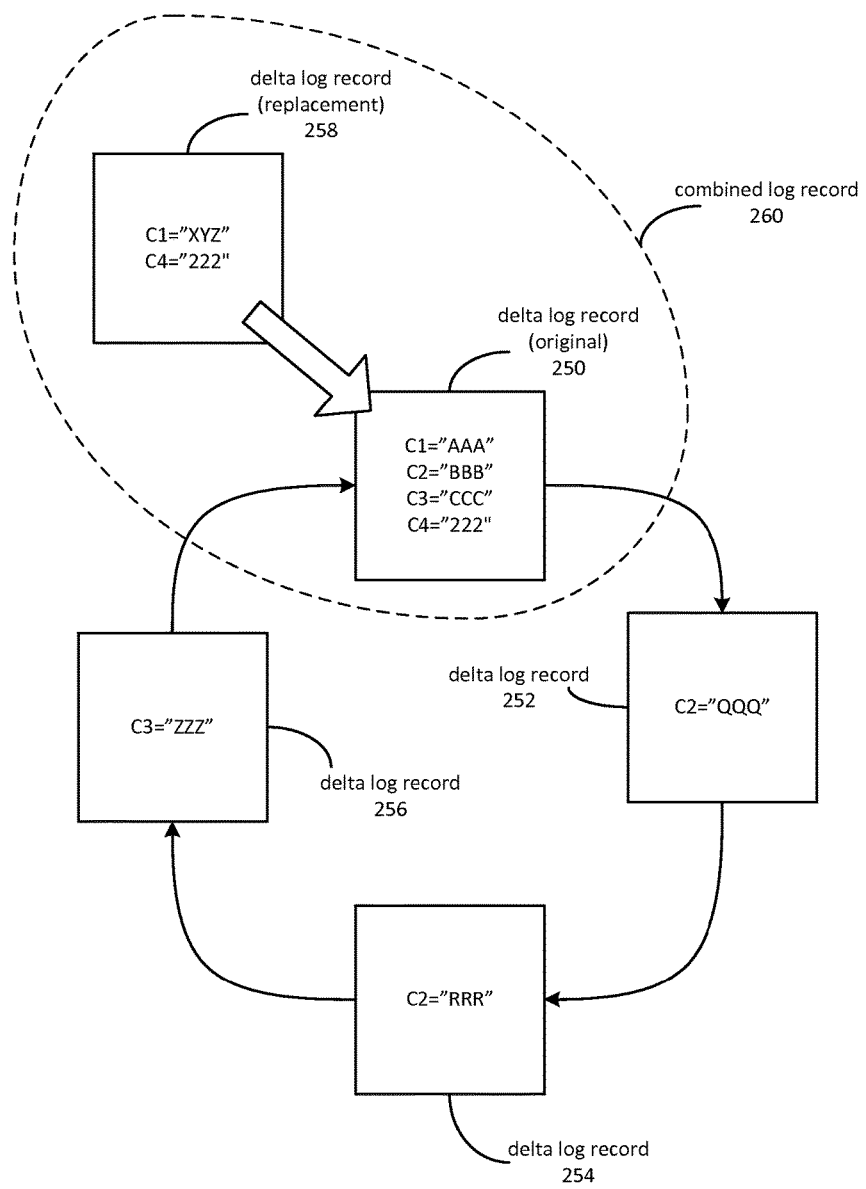
FIG. 2C is a block diagram depicting an embodiment of log-structured storage utilizing a circular buffer.

FIG. 2C depicts an example of a log-structured storage system employing a circular log with a capacity of four log entries. Initially, delta log record 250 may represent the complete state of an object. As changes are made, additional log records such as delta log records 252, 254 and 256 may be added. The state of the object may be constructed by traversing from delta log record 250 to delta log record 256.

When a fourth change is received, delta log record 258 may replace delta log record 250 in the circular log. Embodiments may, for example, overwrite the contents the existing delta log record 250 with the contents of delta log record 258. The replaced entry may contain only those fields necessary to represent the complete state of the object in light of the contents of the circular buffer as a whole. In addition, a combined log record 260 may be created by storing, either within the circular buffer or elsewhere, a complete representation of the object and associating the complete representation of the object with that position in the ring buffer. The complete representation of the object may be used in addition to or instead of traversing the circular log buffer.

In FIG. 2C, replacement delta log record 258 contains values for the fields "C1" and "C4." The former is present because, for illustrative purposes, it was changed from its previous value to the new value of "XYZ." On the other hand, field "C4" is present in delta log record 258 because it was not changed by any of the other entries in the circular log, and accordingly is needed to reconstruct the current state of the object. The complete state of the object can be reconstructed, as before, by traversing the entries in the circular buffer. Note, however, that the starting point of the traversal should shift so that the oldest entry, delta log record 252, is examined first and the newest entry, delta log record 258 is examined last.

One property of log-structured storage systems is that they may be used to form prior versions of an object, at least to the extent permitted by truncation or the capacity of a circular buffer. For example, the sequence depicted in FIG. 2A represents four versions of an object's state. A particular version can be constructed by traversing the log and applying changes until the entry corresponding to the desired version is reached. However, log-structured storage systems such as those depicted in FIGS. 2A, 2B and 2C are not able to provide versions of an object for which they do not have baseline information. Furthermore, when a baseline corresponding to a desired version is available, a long chain of log entries may need to be traversed in order to form the object. Although for illustrative purposes the log-structured storage systems depicted by FIGS. 2A, 2B and 2C have just a few entries, in practice log-structure storage systems may have long chains of entries which may be inefficient to traverse.

Another feature of log-structured storage systems is that they may, much like traditional logs, be shipped to another system in order to replicate data. When two systems share a common baseline for an object, subsequent changes that have been applied to one system may be shipped to the second system to bring it up to date. However, log truncation or the capacity of a circular log buffer may cause the two systems to have differing baselines. When this is the case, it may not be possible for the first system to update the second system by shipping its log entries.

A log-structured storage system may be configured to provide for alternate means of retrieving or realizing a version of an object such as a database page. Retrieving the object may comprise reading a full representation of the object from a storage device. Realizing the object, which may also be described as reconstructing the object, may involve traversing a log of changes, beginning with a full representation of the object, sometimes known as a baseline. In various cases, embodiments may retain information describing a particular set of changes associated with a version of an object, as well as a complete representation of the object. Having both pieces of information, rather than either a delta record or a baseline record, may allow for increased flexibility that may be utilized by various embodiments, such as log shipping, in-memory caches, diagnostic utilities and so forth.

Figure 3:
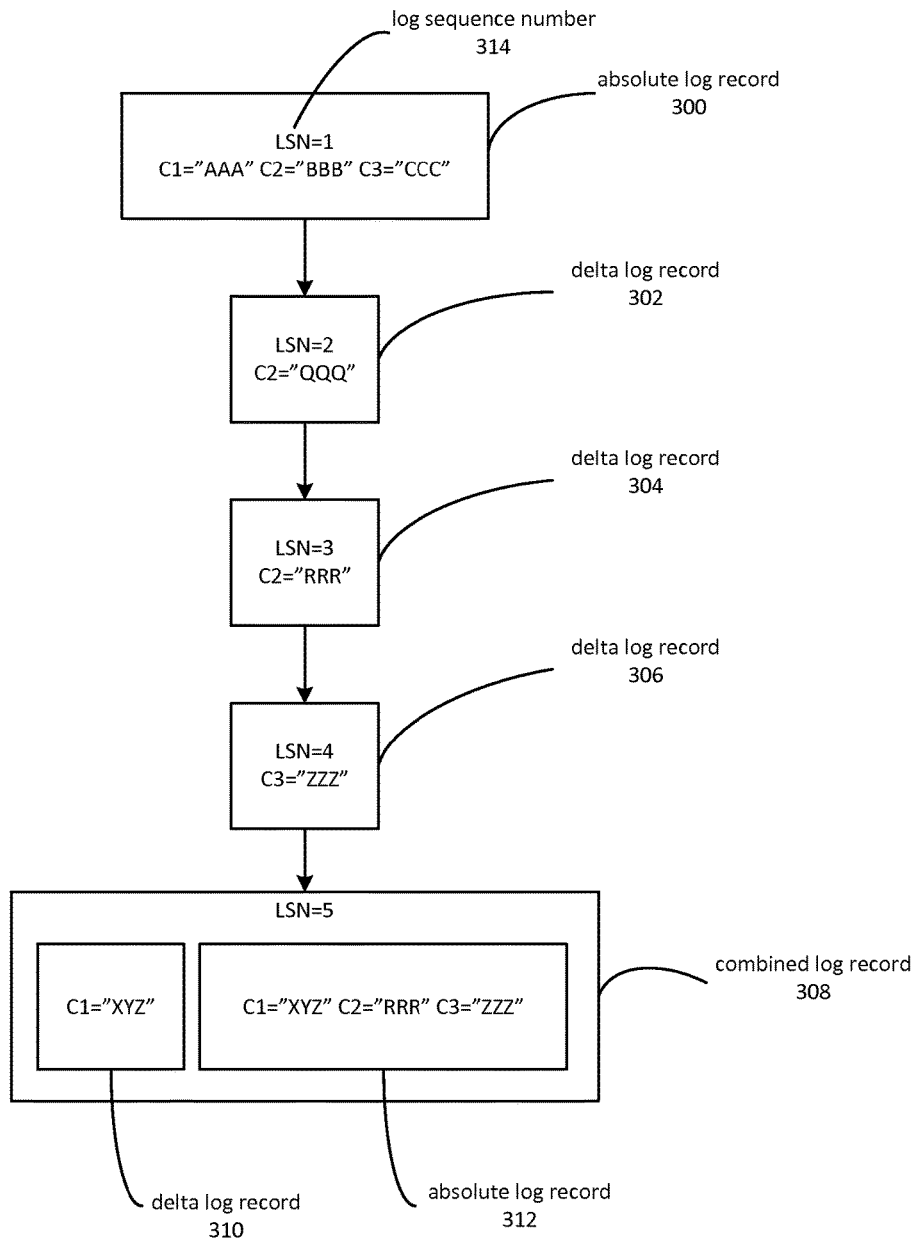
FIG. 3 is a block diagram depicting an embodiment of log-structured storage that comprises entries with combined representations of delta and baseline information.

FIG. 3 depicts an embodiment of a log-structured storage system that utilizes one or more combined log records in addition to the delta log records and absolute log records described previously. Conceptually, a view of the depicted structure is as a linked list of nodes containing records of various types, such as absolute log record 300, delta log record 302, and combined log record 308. Various additional or alternative record types may also be contained by various embodiments. Embodiments may employ a variety of in-memory structure, on-storage structures and various combinations thereof.

Records in a log-structured storage system may be marked with a value indicative of sequential or logical ordering. The value may be indicative of a point in time, a logical ordering, a sequence of changes to an object's state and so forth. This type of value may be described as a log sequence number ("LSN") or a version identifier. In FIG. 3, LSN 314 may be a monotonically increasing integer value. For example, absolute log record 300 might be marked with an LSN of one, delta log record 302 marked with an LSN of two and so forth. Embodiments may employ an LSN or other value indicative of ordering to determine how to apply the changes described in the log to form an object. In FIG. 3, a value for "C2" may be determined using the respective LSN values for delta log records 302 and 304, in that order. Embodiments may process the log sequentially according to LSN values, or may employ various degrees of parallelism to process the log. Some embodiments might also works backwards to reconstruct a version of an object. For example, an embodiment might begin at the latest value and work backwards until the most recent values for all of the fields within an object have been accounted for.

Absolute log record 300 may comprise a complete representation of an object's state corresponding to log sequence number 314. It may represent an initial state of the object, or if the log has been truncated it may represent a subsequent state.

A number of delta log records, such as the depicted delta log records 302, 304 and 306, may follow the absolute log record to describe subsequent changes to the object's state. In various cases and embodiments, there may be a large number of delta log records. A delta log record may indicate a set of changes to the objects state that occurs at a point in time, or other logical ordering, corresponding to an LSN value. A delta log record may indicate that an object field or region has been modified. Delta log record 302, for example, indicates that field "C2" has been changed to the value "QQQ." A single delta log record might describe changes to multiple object fields or regions.

The log-structured storage system might also contain combined log record 308. This record comprises both a delta log record 310 as well as an absolute log record 312, each corresponding to the same LSN value. Accordingly, delta log record 310 and absolute log record 312 each correspond to the same logical state of the object. To form an object whose state corresponding to LSN=5, at least two approaches might be used. One approach involves traversing the log beginning at absolute log record 300 and applying delta log records 300, 302, 304, 306 and 310. A second approach involves retrieving the complete state of the object from absolute log record 312.

Combined log record 308 might be created based on various factors or events. Non-limiting examples include when the number of uninterrupted delta log records grows beyond a threshold value, on an opportunistic basis when an object version is reconstructed, by a background process, on an opportunistic basis when traversing the log for various reasons, when coalescing occurs and so forth. A lazy evaluation model may be employed, in which a delta log entry is marked is a candidate for replacement with a combined log entry and updated the first time the combined log record is needed. Combined log record might be created by forming a new record, modifying a delta log record, linking a delta log record with an absolute log record corresponding to the same version as the delta log and so forth.

The cost of forming an object may be proportional to a count of the number of delta log records between the desired version of the object and the nearest preceding baseline. Embodiments may maintain a count of an actual or estimated number of delta log records within certain regions of the log, such as between each combined log record, or between a combined log record and the end of the log. When the cost of forming an object is high, embodiments may employ flexible traversal options to respond to requests to obtain a version of the object. For example, a combined log record might be retrieved from a storage devise rather than forming the object using a baseline and a sequence of delta log records. Conversely, in some cases there may be less cost associated with forming an object using a traversal as compared to reading a snapshot of the object from a storage device. Embodiments may determine which approach to utilize by comparing costs to threshold values.

Figure 4:
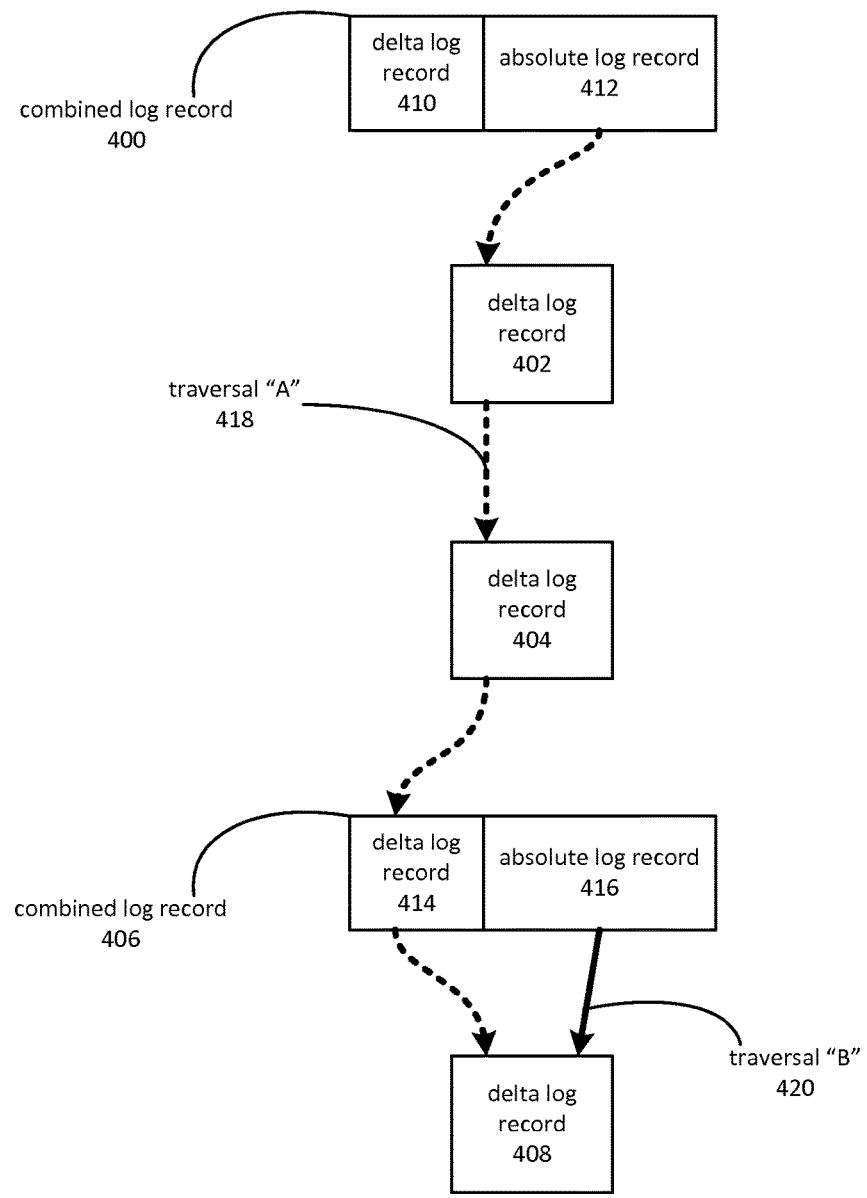
FIG. 4 is a block diagram depicting reconstructing object state using alternate traversal paths in a log-structured storage system that comprises combined log records.

A characteristic of embodiments similar to FIG. 3 is that it provides flexible options for reconstructing object state using alternative traversal paths. FIG. 4 depicts performing equivalent traversals of a log-structured storage system using an embodiment similar to the one depicted by FIG. 3. Traversals "A" 418 and "B" 420 depict alternative paths that may be traversed to arrive at equivalent object states.

Traversal "A" 418 may proceed by obtaining an initial object state from the absolute log record 412 portion of combined log record 400. Combined log record 400 also contains delta log record 410. Traversing the log, delta log records 402 and 404, delta log record 414 from combined log record 406 and delta log record 408 may be combined to arrive at the object's state. The same object state may be arrived at through traversal "B" 420, which involves obtaining a subsequent initial state of the object from absolute log record 416 portion of combined log record 406 and applying changes described by delta log record 408.

The availability of flexible log traversal options may be used in conjunction with log shipping. Two or more log-structured storage systems may be configured to operate as a replication group. For example, changes made to one system within a replication group, sometimes called the master, may be propagated to the other members of the group, so that data on the other systems eventually becomes consistent with data held on the master. Flexible log traversal options may be used to allow efficient transmission of log data between the systems, without requiring each system to truncate or coalesce on the same version of an object. For example, in some embodiments a system that handles a read operation might also perform coalesce and truncation operations while it has a realized version of the object already available as a result of the read. Other systems in the replication group, not having handled a similar read operation, could defer truncation and coalescing to a later time.

Figure 5:
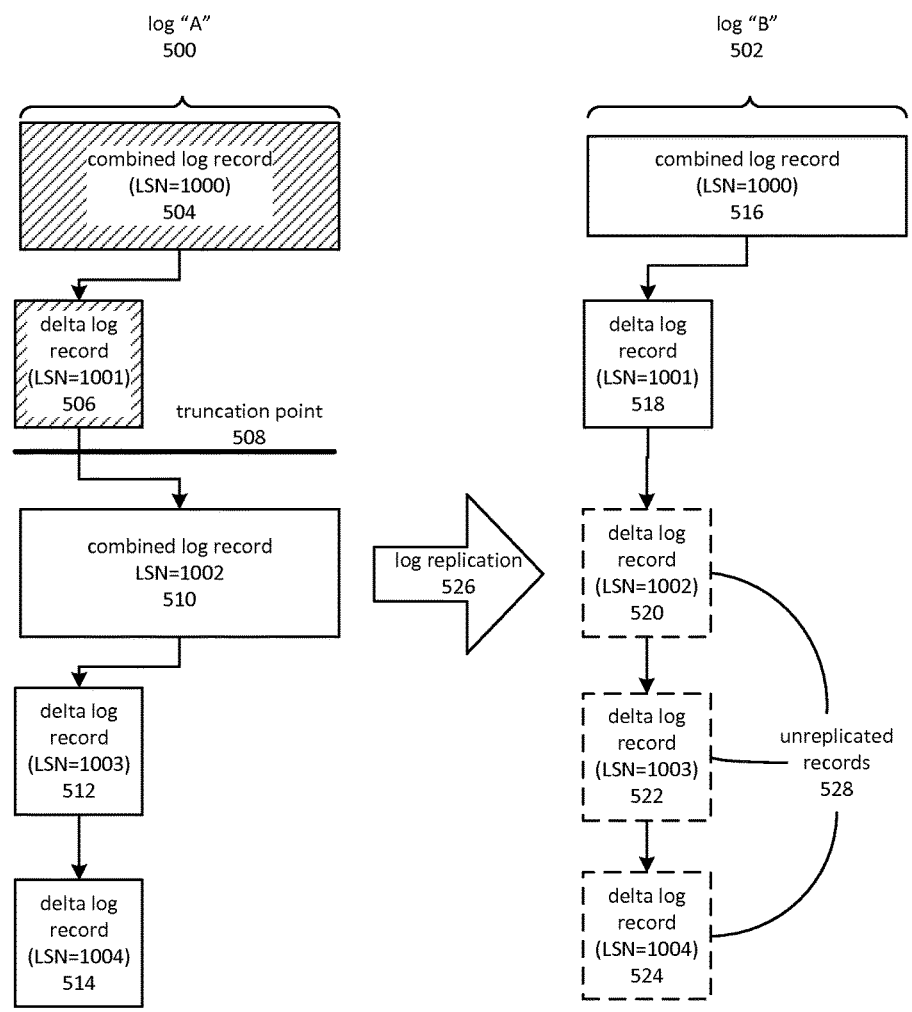
FIG. 5 is a block diagram depicting log replication between log-structured storage systems utilizing combined log records and alternate traversal paths.

FIG. 5 depicts an example of shipping log entries between two log-structured storage systems. Log "A" 500 and log "B" 502 might be associated with log-structured storage subsystems operating on separate computing nodes. For illustrative purposes, log "A" 500 in FIG. 5 may represent a log on a master partition in a replicated database. Requests to change data maintained by the database may be processed by adding additional entries to log "A" 500. These changes may then be replicated over time to log "B" 502 via log replication 526.

At some point log "A" 500 might comprise combined log record 504 with LSN=1000, while log "B" 502 might comprise combined log record 516 corresponding to the same LSN. Accordingly, combined log records 504 and 516 may represent the same object state. Similarly, after delta log record 506 is added to log "A" 500, it may be replicated to log "B" 502 as delta log record 518. Both entries may have LSN=1001 and correspond to the same object state.

It might be the case that log "A" 500 is truncated for any of various reasons. If so, the records above truncation point 508 might be deleted, reused or overwritten. Truncation may occur at different points in the respective structures of log "A" 500 and log "B" 502. In FIG. 5, for example, log "B" 502 has not been truncated.

At some time after truncation log "A" 500 might contain combined log record 510 and delta log records 512 and 514. These records correspond to unreplicated records 528 in log "B" 502, which as depicted in FIG. 5 might comprise delta log records 520, 522 and 524, once data from log "A" 500 has been replicated.

Embodiments may employ various techniques to perform log replication 526. As depicted in FIG. 5, one option involves shipping a delta portion of combined log record 510 from log "A" 500 to log "B" 502. This approach may produce the results depicted in FIG. 5. Any version of the object might then be reconstructed using combined log record 516 and subsequent delta log records 518, 520, 522 and 524.

Another alternative is to ship the absolute log record portion of combined log record 510. However, the absolute log record might be large and therefore take considerable time to ship compared to a relatively small delta log record. On the other hand, the time to ship an absolute log record may be less than the time needed to traverse the log to recover an object's state at a particular point in time. Accordingly, shipping an absolute log record may be efficient in some cases.

A third alternative is to ship both the delta and absolute portions of combined log record 510, along with delta log records 512 and 514. The quantity of data transferred may be similar to shipping an absolute log record by itself, depending on the size of the absolute log record compared to the size of the corresponding delta record. An advantage of this technique is that the change associated with combined log record 510, corresponding to LSN=1002, is known and accessible to log "B" 502.

One or more background routines may operate to perform tasks such as garbage collection, coalescing and compression. Garbage collection involves reclaiming space once occupied by structures that are no longer needed due to truncation, such as combined log record 504 and delta log record 506. Coalescing involves traversing the log to form absolute log records, which may be stored with a corresponding delta log record. Combined log record 510 is one example. However, although combined log record 510 is depicted as immediately following a truncation point, combined log records may be created for any version of an object. For example, a background process might create combined log records for frequently requested versions of an object, or for the most recent version. Compression of the log may consist of removing combined log records that are no longer needed, replacing them with delta log records. Embodiments may also modify combined log records to remove the portion that contains a complete representation of an object. Embodiments may also remove portions of an absolute record or delta log entries that are duplicative of subsequent entries. However, these actions may interfere with reconstruction of object versions corresponding to the removed entries.

Statistics concerning access to delta log records or combined log records may also be kept. One method of doing so is to maintain a table of requested object versions. Some embodiments may keep statistics on access to a combined log record, including which portion of a combined log record was utilized. If the absolute portion of a combined log record is accessed infrequently, it may be a candidate for removal. On the other hand, delta log records that are frequently accessed may be candidates for replacement by a combined log record, particularly those at the end of a series of delta log records.

Figure 6:
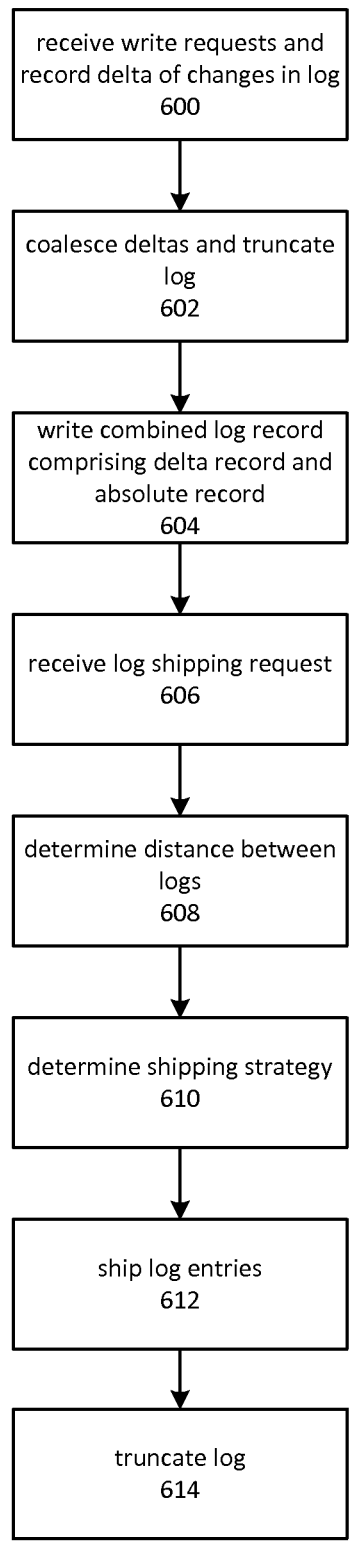
FIG. 6 is a flowchart depicting log replication between log-structured storage systems based on a determination of an optimized log shipping strategy.

FIG. 6 depicts an embodiment of employing log shipping in conjunction with a log-structured storage system that utilizes combined log records. Although depicted as a series of operations, those of ordinary skill in the art will appreciate that at least some of the depicted operations may be altered, omitted, reordered or performed in parallel.

At operation 600, various requests to perform write operations may be received and processed. The write operations may be directed to whatever object the log represents, such as a file, database page, database row and so forth. The changes may be recorded, as described herein, as delta log records in a log file or other log structure consistent with the present disclosure.

At operation 602, the log may be coalesced and truncated. Coalescing and truncation may occur repeatedly at various times while the system is operating. Coalescing involves condensing a number of log records into a smaller number of log records. A sequence of an initial absolute log record and some number of subsequent log records, including both absolute and delta log records, may be condensed into one absolute log record representing the state of the object as of the final record in the sequence.

Some embodiments may employ partial absolute log records, wherein only a subset of fields are coalesced into a single entry. Embodiments may also represent baseline information as a series of delta log records that together contain all of the data needed to represent a baseline version of the object. For example, a first delta log record might represent adding a new object to the log-structured storage system. A second delta log record might represent appending additional data. Together, these two delta log records may act as a baseline of the record, and accordingly may be used in some circumstances in place of a baseline.

Truncating the log involves removing log entries that have been coalesced. Typically, coalescing proceeds from the earliest portion of the log towards the latest portion. Entries behind the coalesced portions may be removed. A log-structured storage system may remove an entry through a variety of means. One method involves removing references to the entry from the log structure and placing a reference to the entry on a list of targets for garbage collections. Numerous other approaches may be utilized to manage removed log entries, such as variants of the circular log structures described herein.

At operation 604, a combined log record may be written to the log. The combined log record may contain an absolute log record and a delta log record, each corresponding to the same version of an object. The absolute log record may be the product of the coalescing performed in operation 602. The delta log record may be equivalent to the last delta log record in a sequence of log records that was coalesced.

At operation 606, a request to ship a portion of a log may be received. Two or more partitions may each contain a version of a replicated log file. One of the partitions may be the master in the replication process, such that changes are propagated from the master to the other partitions. In some embodiments, replication may proceed in both directions. These embodiments may employ various techniques to mark log entries with LSN values that do not conflict with LSN values used by partitions within the group, and to maintain logical consistency or ordering between the LSN values used by partitions within the group.

A request to ship a portion of the log may contain an LSN value representing the latest entry, or corresponding object state, known to the requesting partition. At operation 608, the LSN value supplied in the request may be compared to the LSN value for the log managed by the partition that received the log shipping request. A distance value may be computed or estimated. In this context, distance may refer to the difference in object versions represented by the requesting partitions log and the receiving partitions log. Distance may be calculated using a variety of approaches, such as calculating a difference between the LSN value supplied in the request and the latest LSN value contained in the master partition's log, counting the number of entries between a known point in both logs and so forth. A request to ship a portion of the log may contain indications of which baselines are possessed by the requestor, as well as LSN values or other indicators of the earliest and/or latest delta log records possessed by the requestor.

Operation 610 depicts determining a log shipping strategy to employ. A number of factors may be employed. One of these is the distance between the master partition's log and the replicated log. For example, shipping a long chain of delta records may be inefficient compared to shipping a single absolute log record, depending on the respective sizes of the absolute and delta log records, as well as the number of delta log records involved. Various other factors may also be employed, such as network transmission speed, computational costs and so forth.

Another factor that may be used to determine which log shipping strategy should be employed is the continuity of the respective logs. In order to ship delta log records, both the shipping and receiving logs must meet certain criteria. Delta records may not be shipped if the shipping log does not have access to the relevant delta log records, for example due to log truncation. On the receiving side, the receiving partition must have access to an absolute log record that corresponds to the delta log records to be shipped. If these conditions are not present, a log may be shipped by sending the most recent absolute log record and any subsequent delta records.

Operation 612 depicts sending a delta log records and/or a snapshot of the object according to a selected log shipping strategy. The selected strategy may involve shipping only delta log records, a complete recent version of the object, or a combination of a recent version and subsequent delta log records.

At operation 614, log truncation may occur, potentially at either end of the replication. Due to flexible traversal options, it is not necessary that either side of the replication remain completely synchronized. However, embodiments may perform coalescing and/or truncation following a log shipping operation. For example, upon receiving an indication that a replication partner has possession of a baseline of a version of an object, entries in the log prior to that version may be candidates for coalescing and/or truncation.

Figure 7:
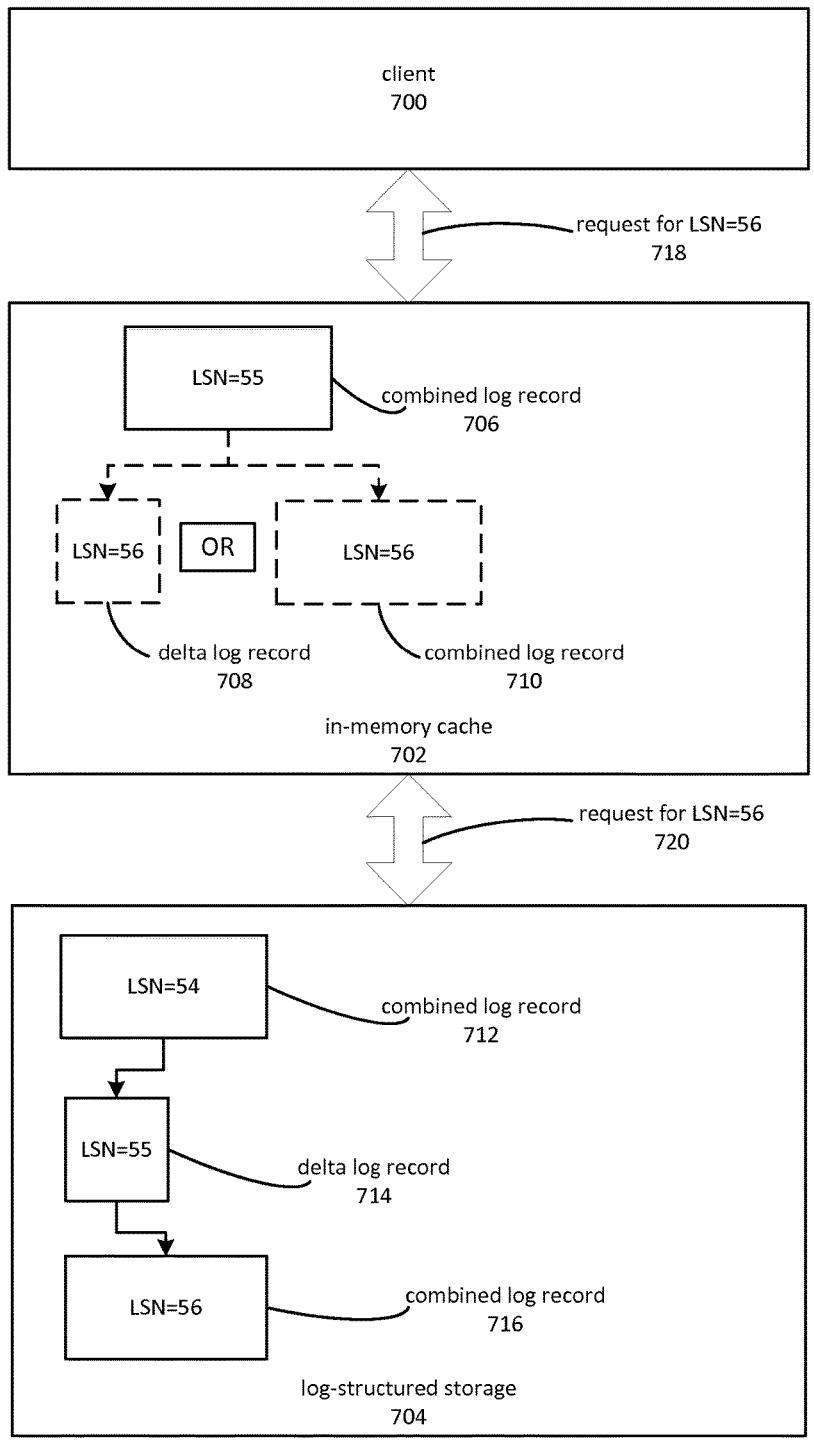
FIG. 7 is a block diagram depicting an embodiment of a log-structured storage system used in conjunction with an in-memory cache.

Log-structured storage systems that utilize a combined log record may also be used in conjunction with in-memory caches. FIG. 7 depicts a client 700 that accesses objects stored by log-structured storage 704. In an embodiment, in-memory cache 702 and log-structured storage 704 may be components of a database management system, and client 700 may be a process residing on a separate computing node and communicating over a network with the database management system. Client 700 may issue requests to retrieve object state from the database management system. In FIG. 7, such a request is depicted by request for LSN=56, as depicted by arrow 718. For illustrative purposes, log-structured storage 704 is presumed to contain combined log record 712, delta log record 714, and combined log record 716.

Client 700 may specify a requested version of an object. If no specific version is requested, the latest version may be assumed as a default. In some cases, client 700 may possess a prior version of an object and only wish to retrieve information describing subsequent changes, so that it may reconstruct the current state of the object itself, rather than requiring the full state to be transmitted from a remote location. In some embodiments, client 700 may supply information about which baseline he possesses and/or which delta versions he possesses. This information may be employed to determine an optimized strategy for transmitting object data to the client. Client 700 may comprise data access libraries capable of reassembling object state from prior absolute records and additional delta records.

In-memory cache 702 may maintain a structure similar to that of log-structured storage 704, in that it may comprise some combination of absolute log records, delta log records and combined log records. In FIG. 7, in-memory cache 702 is depicted as having combined log record 706, corresponding to LSN=55. Delta log record 708 might be stored in in-memory cache 702 when a delta corresponding to LSN=56 is retrieved from log-structured storage 704. Embodiments might also store, within in-memory cache 702, a combined log record 710 containing delta information and a complete object state, both corresponding to LSN=56.

Arrow 718 depicts a request form client 700 for a version of the object corresponding to LSN=56. The request may first be seen by in-memory cache 702. If in-memory cache 702 does not contain sufficient information to process the request, additional information may be obtained from log-structured storage 704. This is depicted by arrow 720. In-memory cache 702 may be associated with the client application, for example as a component of a call-level interface such as ODBC. It may also be associated with various other components, such as a database storage engine.

In some cases, in-memory cache 702 may have a sufficient store of information to return a desired version of the object. In the example of FIG. 7, a request for an object state corresponding to LSN=55 could be satisfied through the in memory cache because a complete version of the object is available. A request corresponding to LSN=56, on the other hand, might not be satisfied entirely from in-memory cache 702 because information pertaining to LSN=56 has not yet been loaded into the cache. To satisfy a request corresponding to LSN=56, additional delta records or an absolute log record may need to be retrieved from log-structured storage 704. A request for LSN=56 might therefore be sent to log-structured storage 704, accompanied by information such as the latest absolute log record held by in-memory cache 702 and/or the latest delta record.

At least three approaches may be employed to complete the request. The first approach involves retrieving an absolute log record corresponding to LSN=56 from combined log record 716, and using the combined log record to return a complete version of the object to the client. This approach might be employed when no version of the object is present in in-memory cache 702. Although FIG. 7 depicts a combined log record 716 corresponding to LSN=56, there may be some cases where log-structured storage 704 does not contain a combined log record for the requested version. If so, embodiments may traverse the log to form the requested object version. A new combined log record might then be added to log-structured storage 704, or held within in-memory cache 702.

A second approach is to read only a delta from combined log record 716 and transfer it to in-memory cache 702. The delta may then be added to in-memory cache 702 as delta log record 708. If a complete object was requested, it may be formed by traversing records in in-memory cache 702, beginning at combined log record 706 and ending at delta log record 708. As an alternative to adding delta log record 708, embodiments may instead add combined log record 710, containing both the materialized object and the delta retrieved from log structured storage.

Embodiments may employ the second approach in order to reduce quantities of data transferred from storage devices containing log-structured storage 704. Particularly where the object is large compared to the size of the delta, reading one or more delta records from log-structured storage 704 may be more efficient than reading the entire object.

A third approach also involves reading a delta from combined log record 716 and transferring it to in-memory cache 702. However, instead of reconstructing the state of the object, the delta information may be returned to client 700 without reconstructing the object's state. In its request to retrieve the data, client 700 may have indicated that it already possesses object state corresponding to LSN=55. Accordingly, the client may itself reconstruct the object's state if it receives delta information describing the changes associated with LSN=56. This approach not only reduces activity on storage devices associated with log-structured storage 704, but also reduces transmission costs between in-memory cache 702 and client 700.

Various criteria may be utilized for determining which approach to use. The choice may be optimized with respect to various criteria, such as utilization of network bandwidth, disk input/output or central-processing unit ("CPU") utilization. If optimizing for network bandwidth, the approach yielding the smallest transmission size may be preferred. In some cases sending a sequence of delta log records may result in smaller transmission size, while in others sending an absolute record would be preferred. If optimizing for CPU utilization, the length of the required traversal and application of changes might be estimated and compared to some threshold to determine whether delta log records or an absolute log record should be transmitted. Another factor is determining which component to optimize for. For example, in some cases and embodiments, server-side resource consumption may be optimized over client-side resource consumption.

Figure 8:
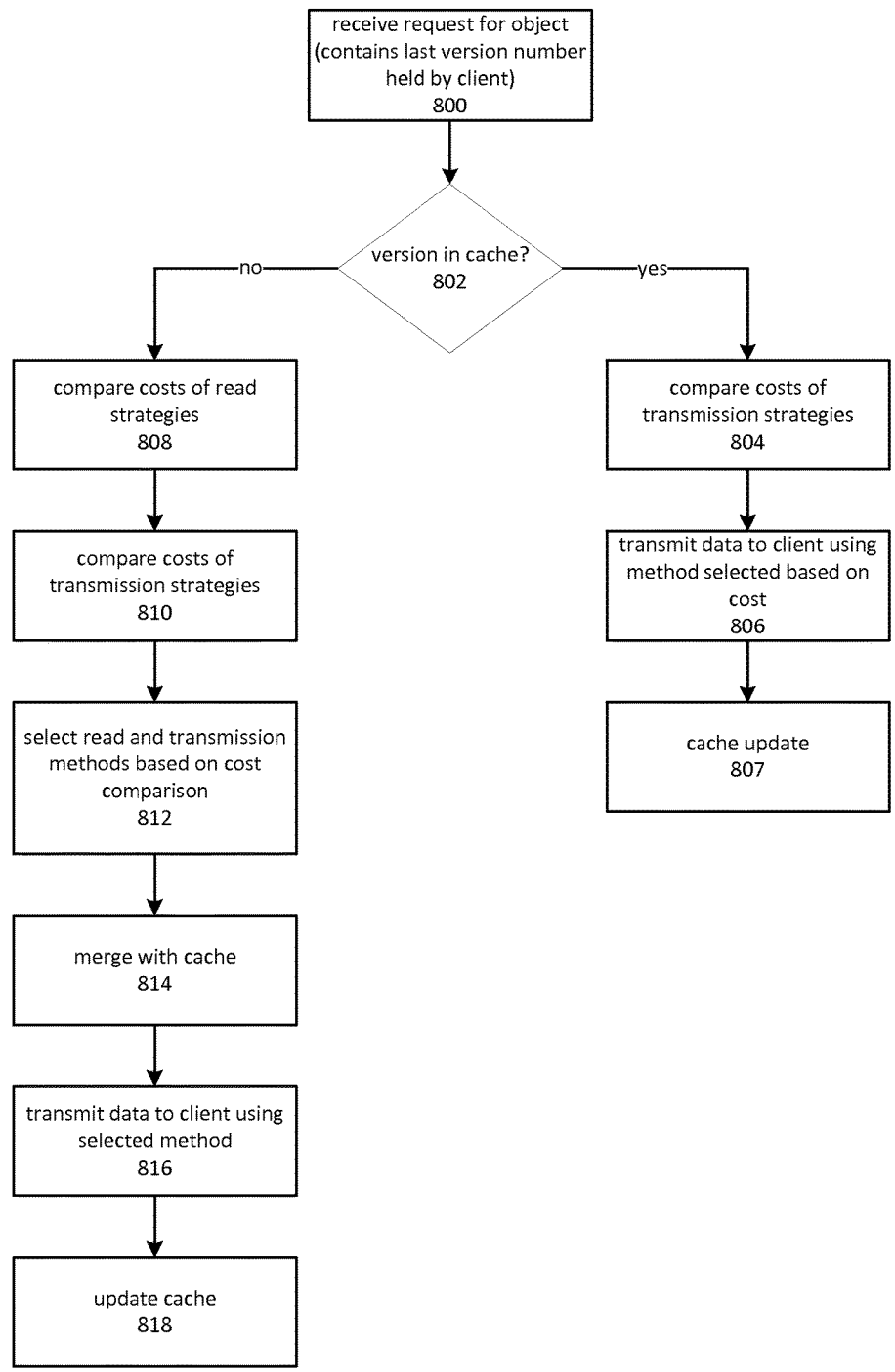
FIG. 8 is a flowchart of an embodiment of determining and utilizing optimized retrieval and transmission strategies for accessing data stored in a log-structured storage system.

FIG. 8 depicts an embodiment for optimizing retrieval and transmission of object state using an in-memory cache in conjunction with a log-structured storage system. Although depicted as a series of operations, those of ordinary skill in the art will appreciate that at least some of the depicted operations may be altered, omitted, reordered or performed in parallel.

At operation 800, a request may be received to retrieve at least a portion of an object from a log structured storage system. The request may be received from a client application which includes, in the request, an indicator of what version of the object it currently possesses. Typically, the version specified will be the latest version of the object possessed by the client. The version may be indicated by an LSN value. Embodiments of the client may be able to reconstruct a desired version of the object based on a version of the object that the client already possesses and delta information that might be returned to the client.

The request may be received by a software module that manages an in-memory cache and accesses a log-structured storage system. The software module may be a component of a database management system which includes an in-memory cache and a log-structured storage system. The request from the client may include an explicit indication of the requested version of the object. Alternatively, a default value such as the latest version may be assumed. The software module may attempt to satisfy the request by some combination of data from the in-memory cache and the log-structured storage system. The software module may also attempt to optimize retrieving data from the log-structured storage system and transmitting data to the client by utilizing the flexibility of combined log records.

Operation 802 involves determining if the request may be satisfied by data contained within the cache. A number of conditions may allow the request to be satisfied based entirely on the contents of the cache. The first is that the requested version is present in the in-memory cache as an absolute or combined log entry. The second condition involves an absolute or combined log record prior to the requested version, followed by a contiguous sequence of delta log records up to and including the requested version. The third condition involves the cache having a contiguous sequence of delta log records from the last version possessed by the client (exclusive of it) to the version requested by the client.

If the request may be satisfied based on the contents of the in-memory cache, operation 804 may be performed to determine how the data should be transmitted to the client. Operation 804 may involve comparing two cost values. The first may be an estimated cost of transmitting the requested data to the client as a sequence of delta log records, while the second cost value may be the estimated cost of sending the data to the client as an absolute log record.

Estimating the cost of transmitting delta information may involve the distance between the version possessed by the client and the requested version. As noted, both of these values would be present in the in-memory cache at least as delta values. Embodiments may calculate distance based on a difference between LSN values, or through various other methods such as traversing in-memory structures containing the delta values. Other factors that may be utilized include actual or estimated size of the delta values and network bandwidth, packet size and latency.

The cost of transmitting the delta values may be compared to the cost of transmitting an absolute record. The cost of transmitting the absolute record may involve the size of the record as well as computational cost that would be incurred by forming the object from a baseline and delta information. This cost may also be based on the distance between the version possessed by the client and the requested version. However, there may be intervening combined log records within this sequence. If so, the computational cost may be based on the distance between the combined log record closest to the requested version. An additional factor that may be considered is whether or not the cost of forming the object should preferably be borne by the database management system or by the client.

Once the method of transmission has been determined, operation 806 may be performed to transmit the data to the client using the selected method. If deltas were transmitted, the client may apply them to the baseline version it possesses to reconstruct the desired version of the object. Various software modules, libraries and so forth may be employed to perform this function. Various non-limiting examples include a call-level interface such as ODBC.

Operation 807 depicts opportunistically updating an in-memory cache. During the course of transmitting data to a client, one or more absolute log records may have been created and can be stored in the in-memory cache as absolute log records or combined log records. Log records read from log-structured storage may also be retained. The in-memory cache may also be truncated or coalesced.

When a record corresponding to the requested version is not present in the in-memory cache, at least some of the required data may be read from log-structured storage. In some cases, a portion of the necessary data may be present in an in-memory cache while the remainder may be in log-structured storage.

At operation 808, the costs of reading requested data from log-structured storage using various strategies may be compared. The strategy may be one of several alternatives. These include reading delta log records, absolute log records or combinations of the two. In some embodiments the log data may be read in bulk, so that it retains delta log records and combined log records. The cost estimates may be based on various aspects such as minimizing the amount of data read from storage and minimizing the number of read operations. Factors such as the location of data on a storage device, block sizes, storage device throughput and so forth may be considered.

To evaluate the cost of reading a sequence of delta log records, the distance between the first and last log record to be retrieved from storage may be considered in determining the read strategy, because a longer distance would be indicative of greater costs of reading delta records. The various factors described previously may be used in combination with a distance value to arrive at an estimated cost.

To evaluate the cost of reading a complete record, several factors may be considered. First is the location of a nearest combined log record. In some cases returning a complete object may involve traversing a large number of delta records, and the larger traversal may be avoided by returning delta records instead of a complete object. In other cases, returning a complete record might involve traversing only a few records or none at all. In such a case, embodiments might choose the strategy of returning a complete record.

Another factor that may be considered is the relative costs of transmitting delta-based records, absolute records or some combination of the two, as depicted by operation 810. The considerations involved may include those described with respect to operation 804. Another factor is whether saving transmission costs is preferred over reducing the costs associated with reading from the log-structured storage system. The preferred transmission method may be considered as a factor in determining the read strategy. Accordingly, operations 808 and 810 may be performed in parallel, combined or their order reversed.

At operation 812, a read strategy may be selected based on various cost factors obtained at operation 808 and the data may be read from the log-structured storage system using the selected read strategy. Accordingly, the result of the read may be either a complete object or a sequence of delta log records. In the former case, the read operation itself may involve traversing the log from the most recent combined log record to a delta log record containing the requested version. In the latter case, it may involve traversing the log to extract delta log records.

Operation 812 may also involve selection of the transmission method based on costs and comparisons derived in operation 810. Embodiments may transmit data in a form identical to or different from what was read from the log-structured storage system. When combined log records are read from log-structured storage, they provide flexibility regarding selection of a transmission method. For example, a sequence of log entries might contain one or more absolute log records, contained within combined log records. In some cases the record could be transmitted as a sequence of delta log records. It could also be transmitted as an absolute log record, or as an absolute log record and a sequence of delta log records.

The selected read and transmission methods may be based on combinations of factors balanced against each other. For example, metrics such as disk utilization, network bandwidth consumption, CPU utilization and so forth may be given various weights in the determination. In addition, the locality of the cost expenditure may be determined, for example by weighing costs incurred by a client application versus costs incurred by a database server.

At operation 814, the data read from the storage device may be merged with the data read from log-structured storage. This may involve appending a sequence of delta log records held in the in-memory cache with delta log records read from log-structured storage. Alternatively, it might involve traversing a list of delta records read from log-structured storage to a version of an object held in a combined log record within the in-memory cache. The result of merging may be determined based on comparison performed in operation 810. Once the data has been merged, it may be transmitted to the client using the selected transmission method, as depicted by operation 816.

At operation 818, the in-memory cache may be updated. This may comprise storing a combined log record, one or more delta records or a combination thereof within the in-memory cache. The in-memory cache may also be truncated, coalesced and so forth. Combined log records may be converted to delta log records, and new combined log records may be created. Updates to the in-memory cache may be performed synchronously or asynchronously. For example, a newly-created log record may be synchronously stored in the in-memory cache, while an asynchronous process might perform truncation or coalescing. Any asynchronous process might also convert combined log records to delta log records.

Embodiments may replace existing combined records with delta records, or in other words delete the absolute record portion of a combined record. This may be done, for example, to conserve storage space. For example, an embodiment might opportunistically create a combined log record following a read operation that performed a traversal of delta log records. If the absolute portion of the combined log record is not utilized for a period of time, or is not used as a new baseline following a truncation operation, the absolute portion of the combined log record might be deleted to conserve storage space.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A client-side component, sometimes referred to as a call-level interface, may be used by the client to facilitate interaction with the database. A DBMS may comprise various architectural components, such as a storage engine that acts to store data one on or more storage devices such as solid-state drives.

Figure 9:
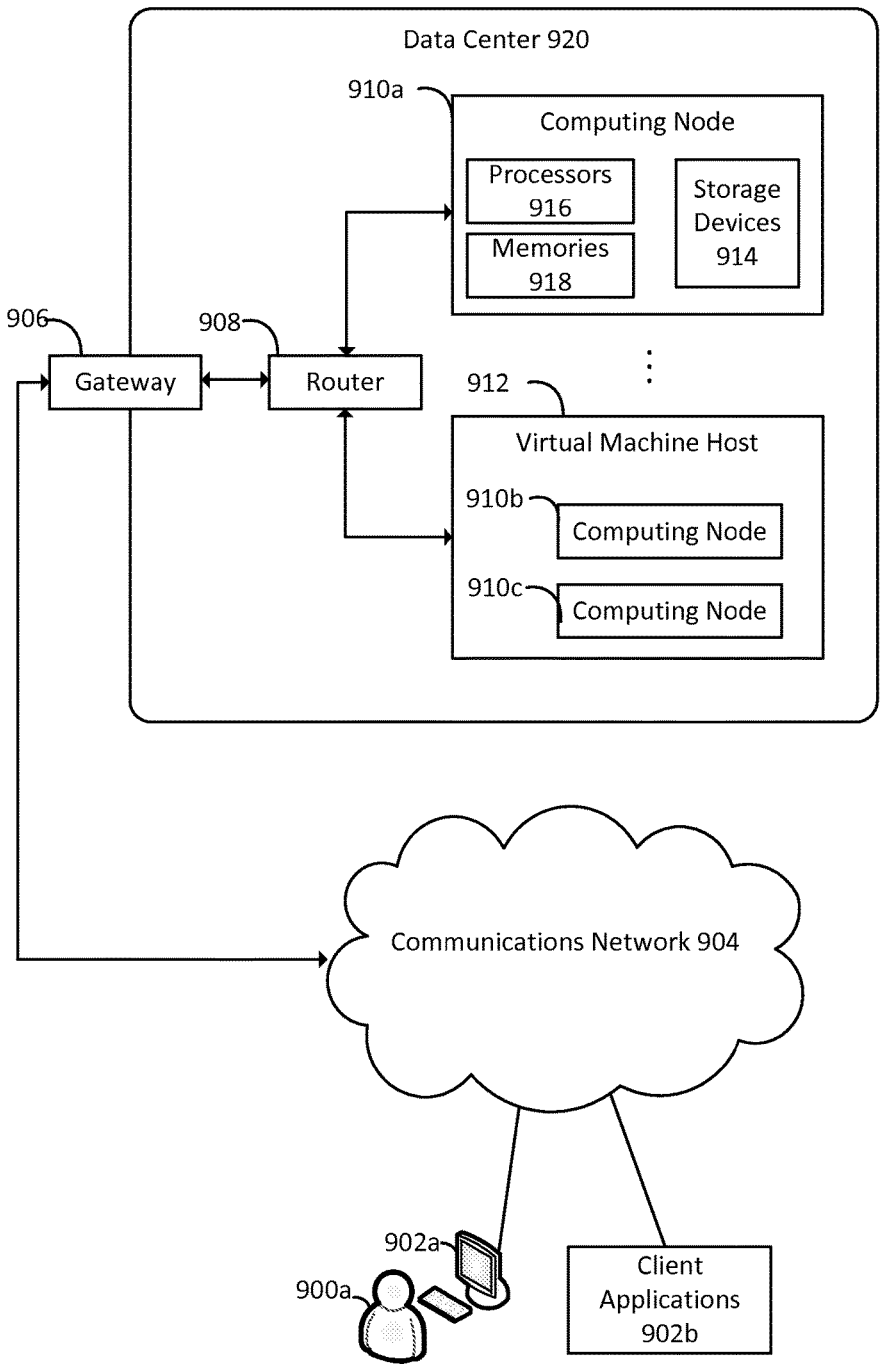
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b and 910c within a data center 920. Alternatively, client applications 902b may communicate without user intervention. Communications network 904 may comprise any combination of communications technology, including the Internet, wired and wireless local area networks, fiber optic networks, satellite communications and so forth. Any number of networking protocols may be employed.

Communication with processes executing on the computing nodes 910a, 910b and 910c, operating within data center 920, may be provided via gateway 906 and router 908. Numerous other network configurations may also be employed. Although not explicitly depicted in FIG. 9, various authentication mechanisms, web service layers, business objects or other intermediate layers may be provided to mediate communication with the processes executing on computing nodes 910a, 910b and 910c. Some of these intermediate layers may themselves comprise processes executing on one or more of the computing nodes. Computing nodes 910a, 910b and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918 and one or more storage devices 914. Processes on computing node 910a may execute in conjunction with an operating system or alternatively may execute as a bare-metal process that directly interacts with physical resources such as processors 916, memories 918 or storage devices 914.

Computing nodes 910b and 910c are depicted as operating on virtual machine host 912, which may provide shared access to various physical resources such as physical processors, memory and storage devices. Any number of virtualization mechanisms might be employed to host the computing nodes.

The various computing nodes depicted in FIG. 9 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A database management system comprising:
one or more memories to store computer-readable instructions, which as a result of being performed by a processor, cause the system at least to:
store a first record in a first log file of a first database partition, the first record comprising information indicative of a first one or more changes to a database object, the first one or more changes applicable to the database object to produce a first version of the database object;
store the first version of the database object;
store a second record in the first log file, the second record comprising information indicative of a second one or more changes to the database object, the second one or more changes ordered after the first one or more changes, the first one or more changes and the second one or more changes applicable to the database object to produce a second version of the database object;
store in the first log file the second version of the database object, the second version based at least in part on applying the first one or more changes and the second one or more changes to the database object, wherein the second record remains stored in the log file after the second version of the database object has been stored; and
delete the first record, but not the second record, from the log file, in response to receiving information indicating that a second database partition has stored the second version of the database object.

2. The system of claim 1, further comprising one or more memories to store computer-readable instructions, which as a result of being performed by a processor, cause the system at least to:
determine to send information indicative of the first one or more changes and information indicative of the second one or more changes to a second computing node, wherein the determination is based at least in part on receiving information indicative of a second log file having a copy of a version of the database object prior to the first version of the database object.

3. The system of claim 1, further comprising one or more memories to store computer-readable instructions, which as a result of being performed by a processor, cause the system at least to:
store the database object in a cache; and
replace the database object in cache with the second version of the database object upon applying the first one or more changes and the second one or more changes to the database object.

4. The system of claim 1, wherein a first computing node comprises the first log file and a second computing node comprises a second log file.

5. A non-transitory computer-readable storage medium having stored thereon instructions that, upon execution by a computing device, cause the computing device at least to:
store a first record on a first one or more storage devices of a first database partition, the first record comprising information indicative of a first one or more changes to an object, the first one or more changes applicable to the object to produce a first version of the object;
store the first version of the object;
store a second record on the first one or more storage devices, the second record comprising information indicative of a second one or more changes to the object ordered after the first one or more changes, the first one or more changes and the second one or more changes applicable to the object to produce a second version of the object;
store the second version of the object on the first one or more storage devices, wherein the second record remains stored on the first one or more storage devices subsequent to the second version of the object being stored; and
remove the first record from the first one or more storage devices in response to receiving an indication that a second database partition has stored the second version of the object, wherein the second record remains stored on the first one or more storage devices subsequent to the first record being deleted.

6. The computer-readable storage medium of claim 5, comprising further instructions that, upon execution by the computing device, cause the computing device to at least:
form a copy of the second version of the object based on a determination that a cost of forming a copy of the second version of the object is less than a cost of retrieving the second version of the object from the first one or more storage devices, the copy of the second version of the object based at least in part on applying the first one or more changes and the second one or more changes to the object.

7. The computer-readable storage medium of claim 5, comprising further instructions that, upon execution by the computing device, cause the computing device to at least:
retrieve the second version of the object from the first one or more storage devices based on a determination that a cost associated with forming a copy of the second version of the object is greater than a cost associated with retrieving the second version of the object from the first one or more storage devices.

8. The computer-readable storage medium of claim 5, comprising further instructions that, upon execution by the computing device, cause the computing device to at least:
send the second version of the object to a client upon receiving an indication that the client does not have a copy of a version of the object prior to the second version of the object.

9. The computer-readable storage medium of claim 8, comprising further instructions that, upon execution by the computing device, cause the computing device to at least:
estimate a cost of forming a copy of the second version of the object based at least in part on a count of changes made to the object.

10. The computer-readable storage medium of claim 5, wherein the object is a database page.

11. The computer-readable storage medium of claim 5, comprising further instructions that, upon execution by the computing device, cause the computing device to at least:
retrieve the second version of the object from the first one or more storage devices upon determining that a cost of forming a copy of the second version of the object has exceeded a threshold.

12. The computer-readable storage medium of claim 5, wherein the first one or more storage devices comprise a log file.

13. A method for storing and retrieving data, the method comprising:
storing a first record on a first one or more storage devices of a first partition, the first record comprising information indicative of a first one or more changes to an object, the first one or more changes corresponding to a first version of the object;
storing a second record on the first one or more storage devices, the second record comprising information indicative of a second one or more changes to the object ordered after the first one or more changes, the second one or more changes corresponding to a second version of the object;
modifying the second record, without removing the information indicative of the second one or more changes, to contain a copy of the second version of the object, the copy of the second version of the object based at least in part on applying the first one or more changes and the second one or more changes to the object; and
deleting the first record based at least in part on a second one or more storage devices of a second partition having stored the second version of the object, wherein the second record remains stored on the first one or more storage devices after the first record is deleted.

14. The method of claim 13, further comprising:
forming a copy of the second version of the object when a cost of forming a copy of the second version of the object is less than a cost of retrieving the second version of the object from the first one or more storage devices, the copy of the second version of the object based at least in part on applying the first one or more changes and the second one or more changes to the object.

15. The method of claim 13, further comprising:
sending, to a client, information indicative of the first one or more changes and information indicative of the second one or more changes upon determining that the client has a copy of a version of the object prior to the second version of the object.

16. The method of claim 13, further comprising:
sending, to a client, a copy of the second version of the object when a cost associated with sending information indicative of the first one or more changes and the second one or more changes is greater than a cost of sending a copy of the second version of the object.

17. The method of claim 13, further comprising:
in response to receiving a request to retrieve the second version of the object, applying the first one or more changes from the first record and the second one or more changes from the second record to a copy of the object held in an in-memory cache.

18. The method of claim 13, further comprising:
storing the second record, with the copy of the second version of the object, in an in-memory cache.

19. The method of claim 13, further comprising:
deleting the second record, the deleting based at least in part on a value indicative of prior operations to access the second record.

20. The method of claim 13, further comprising:
modifying the second record by removing the copy of the second version of the object.

21. The method of claim 13, further comprising:
sending, from a requestor, a request to retrieve information corresponding to the second version of the object, the information comprising one or more of the first one or more changes, the second one or more changes, and the copy of the second version of the object, the request comprising a version identifier corresponding to a complete object state possessed by the requestor.

22. The method of claim 13, wherein the first one or more storage devices comprise a first log file synchronized with a second log file stored on the second one or more storage devices.

\* \* \* \* \*